March 12, 1968     R. C. CARTER     3,372,942
PIPE COUPLINGS
Filed May 13, 1965     2 Sheets-Sheet 1
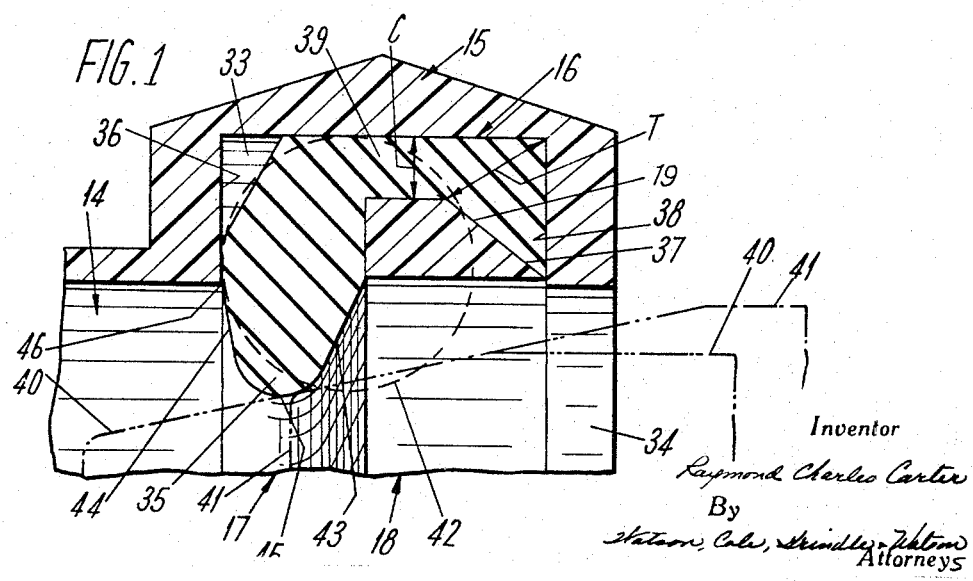

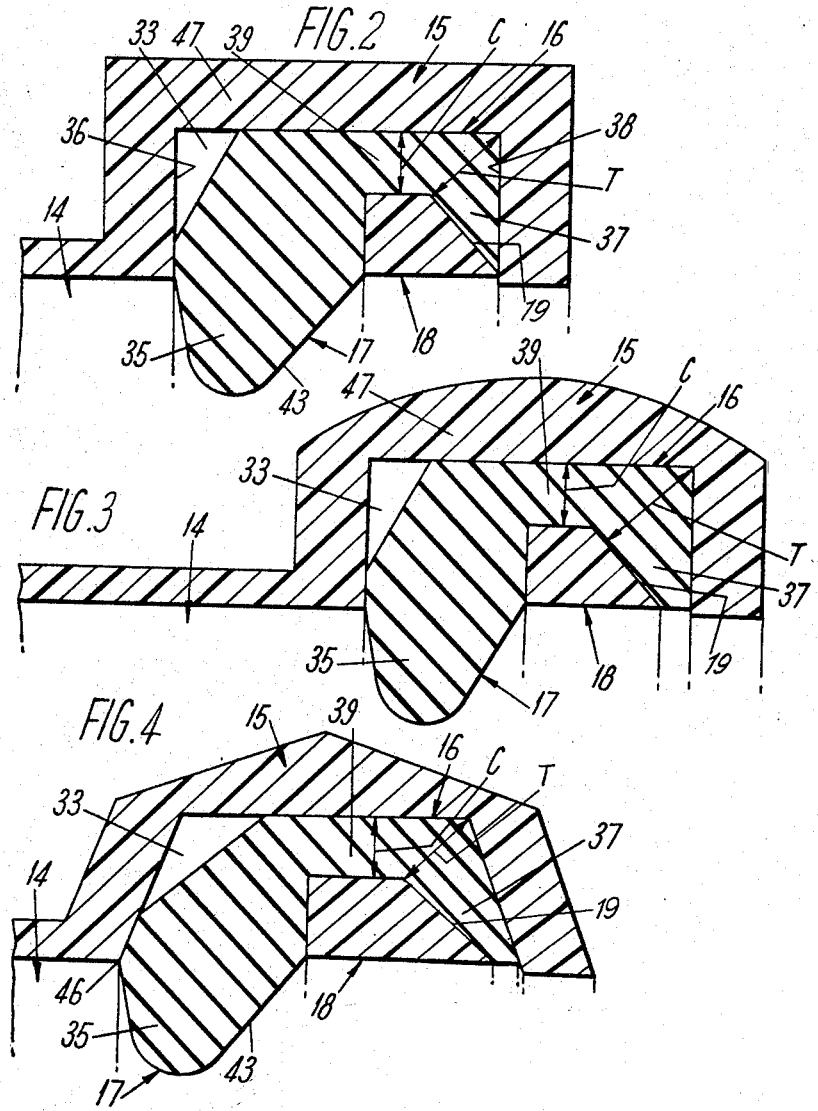

United States Patent Office 3,372,942
Patented Mar. 12, 1968

3,372,942
PIPE COUPLINGS
Raymond Charles Carter, Hazlehead, near Sheffield, England, assignor to The Hepworth Iron Company Limited
Filed May 13, 1965, Ser. No. 455,445
Claims priority, application Great Britain, Feb. 13, 1965, 6,344/65
3 Claims. (Cl. 277—207)

ABSTRACT OF THE DISCLOSURE

A pipe coupling for clayware piping comprising a slightly resilient plastic socket having an inwardly facing annular recess, a resilient sealing ring substantially filling said recess, and an incompressible locking ring, the side of the locking ring nearest the mouth of the socket being bevelled externally.

---

This invention relates to pipe couplings, and more particularly to coupling sleeves for clayware piping, such as is used in sewers, drains and cable conduit, but is also applicable to synthetic plastic piping, being of the type in which a resilient sealing ring is housed in an inwardly-facing annular recess in a socket at one end of a slightly resilient synthetic plastic sleeve or at one end of a slightly resilient synthetic plastic pipe, for the sealing ring to be distorted upon insertion of the spigoted end of a pipe length into the socket.

Using a toroidal or simple standard "O-ring" type of sealing ring of natural or synthetic rubber, there is a tendency for the sealing ring to be dislodged from the recess during insertion of a spigoted pipe end, either by an inserted pipe end of less than nominal diameter rolling the ring over the inner edge of the recess, between which and the peripheral surface of the pipe-length there will be an appreciable annular gap, or by an inserted pipe end of greater than nominal diameter squeezing the ring out of the recess through the gap between the end face of the pipe and the inner edge of the recess, the latter being aggravated the more nearly the initial thrust of the pipe end on the sealing ring approaches the perpendicular to the contacted surface of the sealing ring, because the greater is also the gap through which the ring can be squeezed. While a slight taper or bevel on the pipe end assists in the proper compression of the sealing ring and lessens the probability of the latter condition arising, it aggravates that of the former by increasing the gap into which the ring can be rolled; on the other hand, an absolutely square end lessens the probability of the former condition arising, by lessening the gap, but it does nothing to lessen the incidence of the latter condition. Regardless of whether or not the inserted pipe end is bevelled, it is difficult to ensure that the pipe end is coaxially aligned with the socket during insertion, and any angularity of the pipe end with respect to the socket results in a widening of the gap at one side, thus increasing the likelihood of the sealing ring being rolled out of the recess.

Attempts have been made to overcome this difficulty by providing a sealing ring of other than round section, locked in the recess by an incompressible ring. Thus, one form of sealing ring has a distendible lip extending towards the mouth of the socket from the inner end of the recess, but tends to suffer through lack of reliability of sealing between the sealing ring and the socket, while another form of sealing ring has a distendible lip extending further into the socket from the inner end of the recess, but requires a longer socket to accommodate the greater overall axial length of the sealing ring, especially with tapered pipe ends.

According to the present invention, a pipe coupling comprises a slightly resilient synthetic plastic socket with an inwardly-facing annular recess, a resilient sealing ring, and an incompressible locking ring, the sealing ring having the same overall axial length as the recess and filling the recess, except for an annular portion remote from the mouth of the socket, and for an annular portion adjacent the inside of the sealing ring corresponding to the section of the locking ring, and the locking ring dividing the sealing ring into three parts, one being an annular head for sealing projecting radially inwards of the socket from between the locking ring and the inner end of the recess, another being an annular tail between the locking ring and the outer end of the recess, and the third being the annular portion connecting the tail to the head, with the maximum thickness of the tail exceeding the minimum thickness of the connecting portion and with the side of the locking ring nearest the mouth of the socket bevelled externally.

While the invention is applicable to the socket of a synthetic plastic pipe, it will be considered more particularly in its application to the socket at one end of a synthetic plastic sleeve for use in coupling clayware pipe-lengths, because such pipe-lengths are not only subject to variations from the nominal diameter, but also to departures from the truly circular. Thus the slight resilience of the socket enables it to accommodate itself, and the more resilient sealing ring, to the precise profile of a pipe end inserted into the socket.

The initial thrust of an inserted pipe end on the head of the sealing ring causes the head to distort readily for at least part of the displaced material to be accommodated in the initially unoccupied portion of the recess. Any tendency for the head to be rolled over the inner edge of the recess will be resisted by twisting of the head to urge the connecting portion radially inwards on to the incompressible locking ring, while any tendency for the sealing ring to be drawn out from between the locking ring and the recess will be resisted by the wedging action of the tail of the sealing ring between the incompressible locking ring and the recess.

Since the socket is subjected to substantially radial forces by an inserted pipe end, the socket is capable of slight stretching to assist in accommodating appreciable variation above the nominal diameter of inserted pipe end, but not to such an extent that the tail of the sealing ring could be drawn out from between the locking ring and the recess.

The locking ring is preferably formed of resilient material without any break, because the ability for material displaced from the sealing ring to be accommodated in the initially unoccupied portion of the recess enables the locking ring to be inserted by nipping it slightly across a diameter and pushing one end of the resulting slight oval into the recess in the sealing ring until the latter distorts sufficiently for the rest of the locking ring to be sprung into place.

The side of the head facing the mouth of the socket (i.e., adjacent the locking ring) is preferably bevelled, to assist insertion of a pipe end through the sealing ring, and the other side of the head may be oppositely bevelled to a rounded inner periphery blending into the first bevelled side.

A number of embodiments of the invention will now be described, by way of example only, with reference to the accompanying drawings, in which:

FIGURE 1 is an enlargement of the section of one side of a coupling in accordance with the invention; and FIGURES 2 to 4 correspond to FIGURE 1, but show other shapes of coupling.

In FIGURE 1, a socket 14 (at one end of a synthetic plastic pipe-length or sleeve) has an enlargement 15 containing an inwardly-facing annular recess 16 for housing sealing ring 17, which is secured in place by a locking ring 18 having its side 19 nearest the mouth of the socket bevelled externally. The sealing ring 17 has the same overall axial length as the recess 16 and fills the recess, except for an annular portion 33 remote from the mouth 34 of the socket 14, and for an annular portion occupied by the locking ring 18, which divides the sealing ring into three parts, one being an annular head 35 projecting radially inwards of the socket from between the locking ring and the inner end 36 of the recess, another being an annular tail 37 between the locking ring and the outer end 38 of the recess, and the third being the annular portion 39 connecting the tail to the head, with the maximum thickness T of the tail exceeding the minimum thickness C of the connection portion. The broken lines 40, 41 indicate the greatest variation likely to be encountered in the diameters of clayware pipes all of the same nominal diameter, while the dotted circle 42 represents the section of the equivalent O-ring. The outer face 43 of the head 35 is bevelled, to assist in insertion of a pipe end, which in any case is preferably slightly tapered, and the inner face 44 is also bevelled and blended into the front face by a smoothly rounded crown 45.

The thrust on the head 35 of the sealing ring 17 by the taper of an inserted pipe end causes the head to distort readily for at least part of the displaced material to be accommodated in the initially unoccupied portion 33 of the recess 16. Any tendency for the head 35 to be rolled over the inner edge 46 of the recess will be resisted by twisting of the head to urge the connecting portion 39 radially inwards on to the locking ring 18, while any tendency for the sealing ring to be drawn out from between the locking ring and the recess will be resisted by the wedging action of the tail 37 of the sealing ring between the locking ring and the recess.

Since the socket 14 is subject to substantially radial forces by an inserted pipe end, the socket is capable of slight stretching to assist in accommodating appreciable variations above the nominal diameter of inserted pipe end (e.g., as indicated by the broken line 41), but not to such an extent that the tail 37 of the sealing ring 17 could be drawn out from between the locking ring 18 and the recess 16.

While the shape of the enlargement 15 and the shape of the recess 16 in FIGURE 1 are convenient for manufacture of the socket by injection moulding and provide, with the minimum of synthetic plastic material, reasonable stiffness against splaying of the sides 36, 38 of the recess 16 and flexibility for accommodating usual departures from the nominal diameter and true circularity of inserted pipe ends, these shapes are not critical as long as the annular space 33 is substantially remote from the mouth 34 and the maximum thickness T of the tail 37 is appreciably greater than the minimum thickness C of the connecting portion 39. Thus, as shown in FIGURE 2, the crown 47 of the enlargement 15 may be of uniform thickness or, as shown in FIGURE 3, it may be rounded instead of bevelled. Again, as shown in FIGURE 4, the sides 36, 38 of the recess may be splayed, so that the space 33 is more directly radially behind the head 35.

Suitable materials for the socketed pipes or sleeves are modified or unmodified "rigid" polyvinyl chloride, polycarbonate, polyacetal, acrylonitrile butadiene styrene, and polypropylene. Similar materials may be used for the locking rings, while suitable materials for the sealing rings are natural or (preferably) synthetic rubber, e.g., butyl rubber or like elastomeric materials.

What I claim is:

1. A pipe coupling comprising a resilient synthetic plastic socket having a longitudinally extending axis, said socket being provided with an inwardly-facing, axially-extending annular recess of generally rectangular cross-section adjacent the end of the socket, said recess defined by a continuous wall portion, a resilient sealing ring located in said recess, said sealing ring having the same over-all axial length and completely filling the recess except for an annular portion adjacent the axially inner end of the recess and for an annular groove on the radial inside surface of the sealing ring, said groove being defined at its axially innermost portion by a radially extending surface normal to the axis of the socket and at its axially outermost portion by a bevelled surface inclined toward said radially-extending wall at an acute angle relative to the socket axis and an axially-extending wall portion generally parallel to the socket axis connecting said bevelled and normal surface and a circumferentially continuous locking ring shaped complementarily to said groove positioned in and substantially filling said groove, said locking ring dividing the sealing ring into three parts, one being an annular head projecting radially inwardly of the radially innermost portion of the socket and locking ring from between the locking ring and the inner end of the recess, another being an annular tail between the locking ring and the outer end of the recess and the third being the annular portion integrally connecting the tail to the head with the maximum thickness of the tail exceeding the minimum thickness of the connecting portion and the smallest diameter of the radially innermost portion of the tail portion of the sealing ring and the radially innermost edge of the socket being substantially equal to each other and greater than the diameter of the radially innermost portion of the head portion of the sealing ring.

2. A pipe coupling as in claim 1, wherein the side of the head facing the mouth of the socket is bevelled.

3. A pipe coupling as in claim 1, wherein the side of the head facing the mouth of the socket is bevelled and the other side of the head is oppositely bevelled to a rounded inner periphery blending into the first bevelled side.

References Cited

UNITED STATES PATENTS

| 865,497 | 9/1907 | Kenyon | 285—345 X |
| 1,830,517 | 11/1931 | Luff et al. | 285—155 |
| 2,432,592 | 12/1947 | Stecher et al. | 285—231 |
| 2,986,411 | 5/1961 | Anderson | 285—230 X |
| 3,272,538 | 9/1966 | Bergstrom | 285—231 |

OTHER REFERENCES

| 1,363,048 | 4/1964 | France. |
| 1,118,551 | 11/1961 | Germany. |
| 980,901 | 1/1965 | Great Britain. |

CARL W. TOMLIN, Primary Examiner.

DAVE W. AROLA, Assistant Examiner.